US005299778A

United States Patent [19]

Kimberlin

[11] Patent Number: 5,299,778

[45] Date of Patent: Apr. 5, 1994

[54] THROTTLE VALVE SYSTEM FOR A PERCUSSIVE FLUID-ACTIVATED APPARATUS

[75] Inventor: Robert R. Kimberlin, Troutville, Va.

[73] Assignee: Ingersoll-Rand Company, Woodcliff Lake, N.J.

[21] Appl. No.: 955,174

[22] Filed: Oct. 1, 1992

[51] Int. Cl.⁵ .......... F16K 31/524

[52] U.S. Cl. .......... 251/263; 137/454.2

[58] Field of Search .......... 251/251, 262, 263; 137/454.6, 454.2

[56] References Cited

U.S. PATENT DOCUMENTS

| | | | |
|---|---|---|---|
| 1,054,343 | 2/1913 | Faessler | 251/263 |
| 1,796,995 | 3/1931 | Katterjohn | 251/263 |
| 1,871,758 | 8/1932 | Stevens | 251/263 |
| 2,068,660 | 1/1937 | Curtis | 251/263 |
| 2,357,385 | 9/1944 | DePaepe | 251/263 |
| 2,490,944 | 12/1949 | Buchanan | 251/263 |
| 3,192,943 | 7/1965 | Moen | 137/454.6 |
| 3,792,714 | 2/1974 | Miller | 137/494 |
| 4,164,234 | 8/1979 | Liepert | 137/51 |
| 4,535,802 | 8/1985 | Robertson | 137/322 |
| 4,749,005 | 7/1988 | Bergquist | 137/877 |
| 4,776,561 | 10/1988 | Braunlich et al. | 251/39 |
| 4,813,492 | 3/1989 | Biek | 137/2 |
| 4,844,176 | 7/1989 | Podsobinski | 137/505.13 |
| 4,865,078 | 9/1989 | Ensign | 137/636.1 |
| 5,072,752 | 12/1991 | Kolchinsky | 137/493 |

*Primary Examiner*—George L. Walton
*Attorney, Agent, or Firm*—John J. Selko

[57] ABSTRACT

A throttle valve system for a percussive, fluid-activated apparatus includes an inlet port in a backhead, a backhead bore in the backhead, fluid passageways through the backhead to a central bore of the apparatus, a removable seal elastically mounted in the backhead bore for opening and closing the backhead bore and a throttle lever having a cam detent surface thereon for opening and closing the seal, as the lever is moved.

7 Claims, 2 Drawing Sheets

THROTTLE VALVE SYSTEM FOR A PERCUSSIVE FLUID-ACTIVATED APPARATUS

BACKGROUND OF THE INVENTION

This invention relates generally to a percussive, fluid-activated apparatus, and more particularly to a throttle valve system for a percussive, fluid-activated jackhammer. Typical throttle valve arrangements for jackhammers often consist of a single, rotary-type of valve. The clearance between the valve and surrounding housing demands extremely tight tolerances in order to prevent leakage past the valve. Leakage across the valve would result in uncontrolled operation of the tool. Such valves are relatively insensitive and nonresponsive to flow of fluid, and, therefore, do not provide the operator with good "feel" for best control of the tool.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a throttle valve system in a backhead of a percussive, fluid-activated apparatus including a percussive fluid inlet port; passageway means in the backhead for fluid communication between the inlet port and a central bore of the apparatus; a seal elastically mounted in the backhead for opening and closing the passageway means; and a throttle on the backhead for opening and closing the seal.

The foregoing and other aspects will become apparent from the following detailed description of the invention when considered in conjunction with the accompanying drawing FIGURES.

BRIEF DESCRIPTION OF THE DRAWING FIGURES

DETAILED DESCRIPTION

Figure 1:
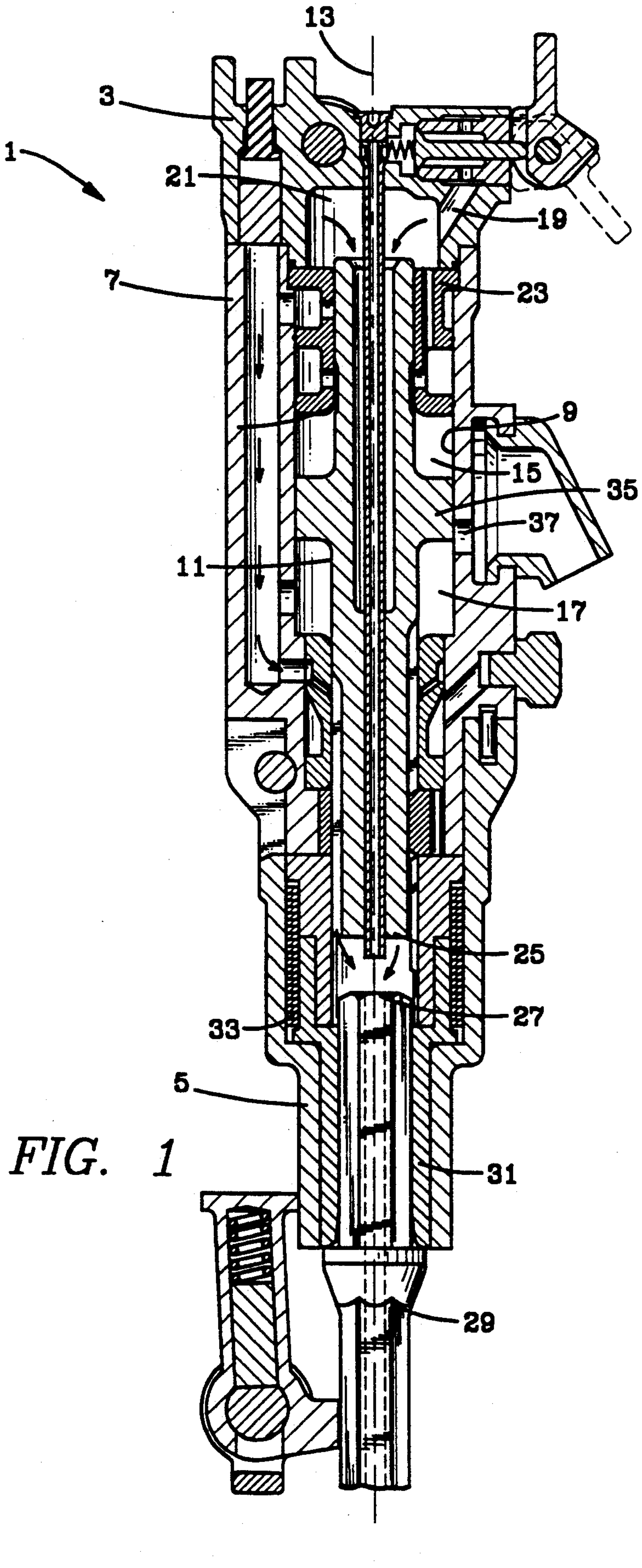
FIG. 1 is a side elevational view, in cross section, with parts removed, of a jackhammer with the throttle valve system of this invention mounted thereon.
Figure 2:
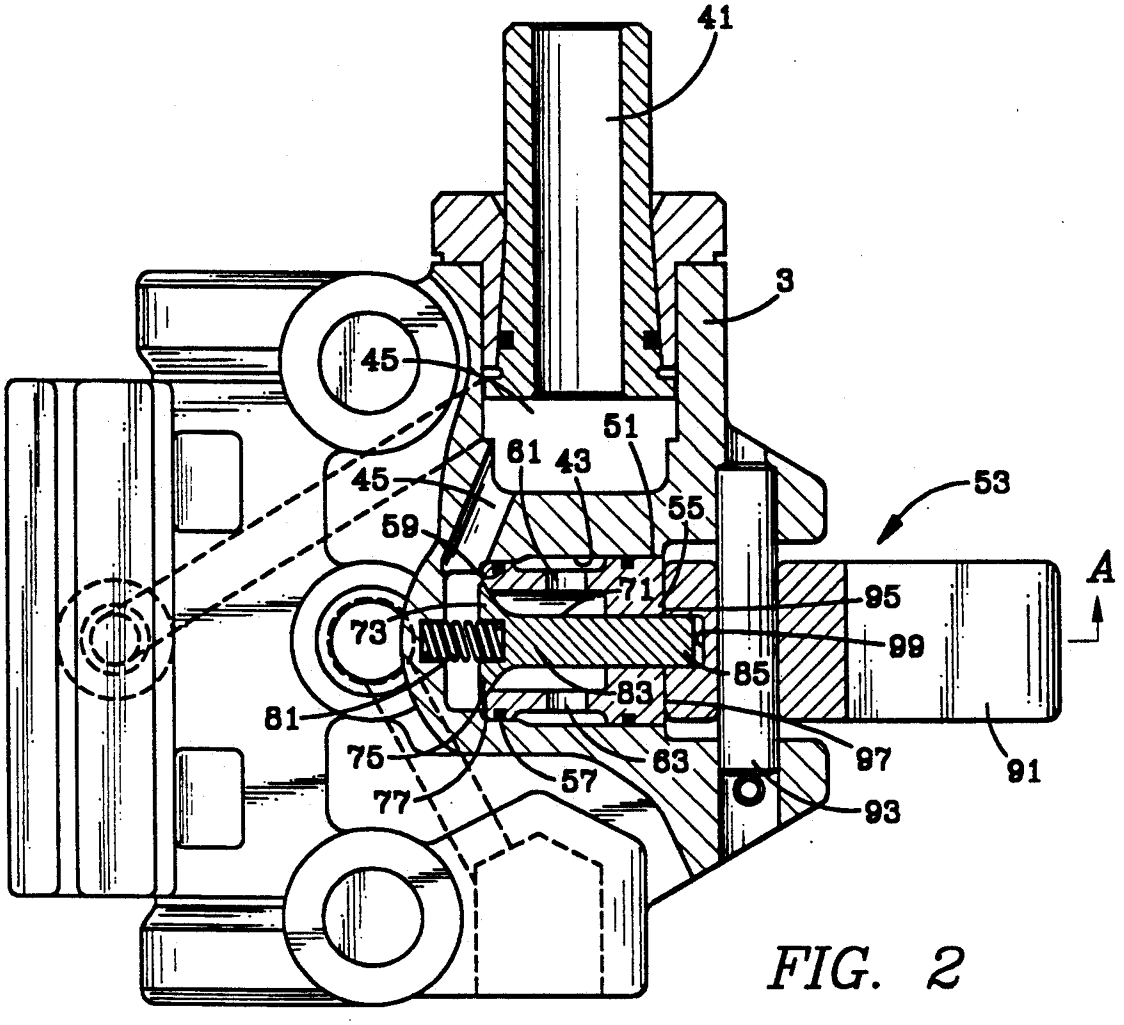
FIG. 2 is a top view, partially in cross section, with parts removed of the backhead of the jackhammer of FIG. 1; and part of this invention.
Figure 3:
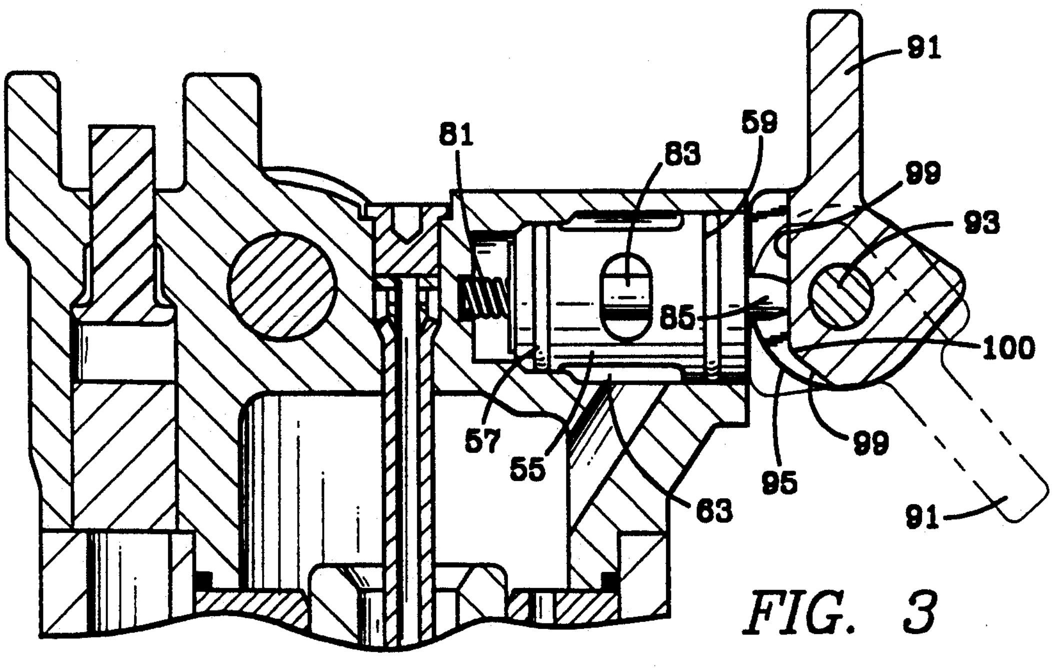
FIG. 3 is view, partially in cross section, with some parts shown in elevation, along A—A of FIG. 2.

Referring to the drawings, FIG. 1 shows a percussive, fluid-activated jackhammer 1 having a backhead 3 at a top end thereof, a fronthead 5 at a bottom end and a housing 7 therebetween forming a central bore 9. Piston 11 reciprocates back and forth along a longitudinal axis 13 through bore 9 between a drive chamber 15 and a return chamber 17. Piston 11 is activated by compressed air that enters into drive and return chambers, 15 and 17, respectively by way of passageway 19, air accumulator chamber 21, and air distributor 23, as is well known. As piston 11 reciprocates, front end 25 strikes against the top end 27 of a drill steel 29 slidably mounted in chuck 31 in fronthead 5 Means for causing rotation of drill steel 29 are positioned in fronthead 5, and in this case, rotation is caused by a wrap spring clutch mechanism, shown generally as 33. As piston head 35 reciprocates back and forth, it alternately exposes drive chamber and return chamber 15, 17 to an exhaust port 37 in housing 7, as is well known. The arrangement of passageways and chambers below accumulator chamber 19 are shown for illustration purposes, but form no Referring to FIG. 2, the throttle valve system of this invention is shown. Inlet port 41 carries percussive fluid into backhead 3. Passageway means in backhead 3, described hereinafter, provide fluid communication between inlet port 41 and central bore 9 of apparatus 1.

A backhead bore 43 extends through backhead 3. One end of backhead bore 43 is in fluid communication with inlet port 41 by way of passageway 45, and the other end of backhead bore 43 extends to the outside atmosphere.

Seal means 51 is removably mounted in backhead bore 43 in sealing contact with the sidewalls of backhead bore 43. The purpose of seal means 51 is to open and close the passageways between inlet port 41 and central bore 9 by opening and closing backhead bore 43, in response to a throttle means 53 mounted on backhead 3.

Seal means 51 includes a cylindrical valve cartridge housing 55 in fluid sealing contact with sidewalls of backhead bore 43. Housing 55 is elastically mounted in backhead bore 43 by means of elastic 0-rings 57 carried in grooves 59 in the outer surface of cartridge housing 55. Housing 55 is slidably inserted into backhead bore 43, and requires some means for retention in backhead bore 43, as described hereinafter. Housing 55 has an internal valve bore forming a valve chamber 61 therein. Apertures 63 in sidewalls of cartridge housing 55 fluidly communicate valve chamber 61 with central bore 9 by way of passageway 19 (FIG. 1).

Slidably extending through housing 55 is a valve stem 71. Valve stem 71 has a first valve stem end 73 with a head portion 75 in fluid sealing contact with a valve seat surface 77 in valve housing 55. Elastic spring means 81 seated between backhead 3 and valve head 75 biases valve stem 71 into a normally closed position, that is, into contact with seat surface 77.

Valve stem 71 has an elongated valve stem body 83 that extends through housing 55 to terminate in a second valve stem end 85 that extends outside valve housing 55 to contact throttle means 53.

Throttle means 53 includes a throttle lever 91 pivotally mounted on backhead 3 above cartridge housing 55. Lever 91 can pivot about axis 93. Lever 91 has a pair of spaced apart curved surfaces 95 and 97 in sliding contact with housing 55, to retain housing 55 in backhead bore 43. Between curved surfaces 95 and 97 is a cam detent surface 99 that is in sliding contact with second valve stem end 85. Thus, it can be understood that as lever 91 is pivoted about axis 93 curved surfaces 95, 97 retain cartridge 55 in bore 43 and cam detent surface 99 permits valve stem 71 to move up and down in valve bore chamber 61 to open and close valve 51. I prefer to provide cam surface 99 with an apex 100 separating two cam surface portions, so as to provide a positive detent in both the on and off positions. If desired, a plurality of cam surfaces 99, with an apex between each surface, can be provided to provide a plurality of valve opening settings, for added operator sensitivity and control.

I prefer to provide valve housing 55 and valve stem 71 from a suitable plastic chosen from the polyethylene family of plastics. Such material exhibits suitable wear characteristics together with lightness, which reduces the overall weight of the apparatus. The elastic flexible mounting of the housing cartridge 55 in backhead bore 453 provides added sensitivity and responsiveness to the flow of percussive fluid, thereby increasing operator control of the apparatus.

While I have shown the cartridge as removable for ease of repairs, it would be equivalent to provide a metallic cartridge and stem that are permanently mounted in bore. Thus, only stem end 85 would extend out of backhead 3 and be contacted by throttle 53.

Having described the invention, what is claimed is:

1. A throttle valve system for a percussive, fluid-activated apparatus, said apparatus having a backhead at a top end, a fronthead at a bottom end, a housing therebetween forming a central bore and a piston reciprocal along a longitudinal axis through said central bore between a drive chamber and a return chamber, said throttle valve system comprising:

a. a percussive fluid inlet port in said backhead, for admitting percussive fluid into said backhead, for activating said piston;

b. percussive fluid passageway means in said backhead for fluid communication between said inlet port and said drive chamber and said return chamber;

c. seal means elastically mounted in said backhead for opening said closing said percussive fluid passageway means;

d. throttle actuating means on said backhead for opening and closing said seal means;

e. said seal means further comprising:

i. a backhead bore in said backhead in fluid communication with said percussive fluid inlet port;

ii. a valve cartridge housing in fluid sealing contact in said backhead bore;

iii. said percussive fluid passageway means in said backhead further comprising a valve cartridge passageway means actuating through said valve cartridge housing, for fluid communication between said percussive fluid inlet port and said drive chamber and said return chamber; and iv. valve stem means in said valve cartridge housing for opening and closing said valve cartridge passageway means, in response to said throttle means; and f. said throttle actuating means comprising a first contact surface in sliding contact with said valve cartridge housing for retaining said valve cartridge housing within said backhead bore and a second contact surface thereon in siliding contact with said valve stem for moving said valve stem means between a valve open and a valve close position.

2. The valve system of claim 2 wherein said valve cartridge housing is removably mounted in said backhead bore.

3. The valve system of claim 2 wherein said valve cartridge housing is elastically mounted in said backhead bore against a plurality of elastic O-rings.

4. The valve system of claim 3 further comprising:

a. elastic bias means in said backhead bore for biasing said valve stem means into a normally closed position.

5. The valve system of claim 4 wherein said valve stem means further comprises:

a. a first valve stem end in fluid sealing contact with said valve cartridge housing when said valve cartridge passageway means is closed and out of contact with said valve cartridge housing when said valve cartridge passageway means is open;

b. a second valve stem end extending outside of said valve cartridge housing and in contact with said throttle means: and c. an elongated valve stem body therebetween, said valve stem body reciprocal in said valve cartridge housing between an open and closed position.

6. The valve system of claim 5 wherein said throttle means further comprises:

a. a throttle lever pivotally mounted on said backhead about a pivot axis spaced above said valve cartridge housing;

b. said first contract surface being a curved surface on said throttle lever, in slidable contact with an upper end of said valve cartridge housing, for retaining said valve cartridge housing in said backhead bore, as said throttle lever is pivoted about said pivot axis; and c. said second contact surface being a cam detent surface on said throttle lever, in slidable contact with said second valve stem end, for permitting said valve stem to reciprocate back and forth in said valve cartridge housing, as said throttle lever is pivoted about said pivot axis.

7. A throttle valve system for a percussive, fluid-activated apparatus, said apparatus having a backhead at a top end, a fronthead at a bottom end and a housing therebetween forming a central bore comprising:

a. a percussive fluid inlet port in said backhead;

b. a backhead bore in said backhead in fluid communication with said inlet port;

c. percussive fluid passageway means in said backhead for fluid communication between said backhead bore for opening and closing said percussive fluid passageway means;

e. throttle means on said backhead for opening and closing said seal means;

f. said seal means further comprising:

i. a removable valve cartridge housing elastically mounted in fluid sealing contact in said bore;

ii. valve cartridge passageway means through said valve cartridge housing, for fluid communication between said inlet port and said central bore; and iii. valve stem means in said valve cartridge housing for opening and closing said valve cartridge passageway means, in response to said throttle means; and g. said throttle means further comprising:

i. a throttle lever pivotally mounted on said backhead about a pivot axis spaced above said valve cartridge housing;

ii. curved contact surface means on said throttle lever, in slidable contact with an upper end of said valve cartridge housing, for retaining said valve cartridge housing in said backhead bore, as said throttle lever is pivoted about said pivot axis; and iii. cam detent contact surface means on said throttle lever, in slidable contact with said second valve stem end, for permitting said valve stem to reciprocate back and forth in said valve cartridge housing for opening and closing said valve cartridge passageway means as said throttle lever is pivoted about said pivot axis.

* * * * *